United States Patent
Usov et al.

[15] 3,685,362
[45] Aug. 22, 1972

[54] CHAIN FOR CHAIN TRANSMISSION

[72] Inventors: Vladimir Viktorovich Usov, ulitsa Sotsialisticheskaya, 29a, kv. 29, Zernograd Rostovskoi oblasti; Lev Konstantinovich Shinevsky, ulitsa Lenina, 97, Krasnodar, both of U.S.S.R.

[22] Filed: Sept. 30, 1970

[21] Appl. No.: 76,701

[30] Foreign Application Priority Data

Oct. 6, 1969    U.S.S.R. .................. 1367166

[52] U.S. Cl. ........................... 74/253 R, 74/250 R
[51] Int. Cl. ........................................ F16g 13/02
[58] Field of Search ............... 74/250 R, 253, 245 R

[56] References Cited

UNITED STATES PATENTS 3,496,784   2/1970   Freeman .................. 74/250 R

*Primary Examiner*—Leonard H. Gerin
*Attorney*—Holman & Stern

[57] ABSTRACT

A chain for a chain transmission in which the chain links consist of rings connected through rollers. The chain needs no lubrication and successively operates under conditions when the linear velocity of its links exceeds 4 m/sec.

8 Claims, 4 Drawing Figures

CHAIN FOR CHAIN TRANSMISSION

The present invention relates to chain transmission and, more particularly, the invention relates to a chain for a chain transmission comprising links connected through rollers.

The chain according to the invention can be most successively used under conditions when the linear velocity of the chain links exceeds 4 m/sec. The chain does not require a lubricant and can operate in the presence of an abrasive medium. Such conditions are typical for operation of agricultural machinery.

In the known chain transmissions a chain is commonly employed comprising links in the form of plates. In this case the links of one half of the chain are interconnected through rollers and are more spaced than the links of the other half, connected through bushings. The links of said one half alternate with the links of said other half, in which case said bushings embrace said rollers. The links of the chain enveloping the sprocket rotate relative to each other and a sliding friction appears between the bushing and the roller and between the bushing and the sprocket tooth resulting in quick wear of the chain and sprockets, particularly at a linear velocity of the chain links exceeding 4 m/sec.

Even good lubrication does not provide for smooth operation of the chain in the presence of an abrasive medium. In this case the consumption of a lubricant is so large that the cost of this lubricant considerably exceeds that of the chain.

In addition, the lubricant almost does not penetrate into the gap between the bushing and the roller. This causes excessive heating of the chain.

In order to increase the life of the chain transmission, rolls are often put on the bushings, in which case the wear of the sprocket teeth is somewhat reduced while the rolls wear out slowly. Nevertheless, the sliding friction between the bushing and the rolls still exists and the efficiency of the known chains is relatively small.

An object of the present invention is to eliminate the above mentioned disadvantages.

The main object of the invention is to provide such a chain in which a rolling friction occurs in the place of contact of one link of the chain with the other link, the chain needing no lubrication.

According to the invention, this object is accomplished due to the fact that the chain links consists of rings interconnected through rollers. During the interaction of the roller with the sprocket tooth each pair of the rings in the two pairs connected through this roller is run relative to this roller in the same direction on the continuously changing places of contact. Simultaneously, the rollers are run during the interaction with the sprocket teeth. In this case the running is possible only in the absence of the lubricating medium.

In a preferable version of making the chain according to the invention the inner diameter of each ring should be selected equal to the sum of the pitch of rollers and the diameter of the roller portion contacting the rings. This provides for uniform distribution of stresses in each link of the chain.

The diameter of the roller section contacting the rings is preferably less than the inner diameter of the ring by a factor of at least 3.5.

In this case the sliding friction is eliminated when the chain envelopes the sprocket having a small number of teeth, but not less than 14 teeth.

In a version of the chain, each roller of which has at least a pair of sections contacting the rings, the length of this section being equal to the double thickness of the ring, the rings are preferably made with an external diameter determined by the inequality:

$$D \leq t(1 + \cos(360°)/(z)),$$

where
  $D$ is an external diameter of the ring,
  $t$ is a pitch of the rollers,
  $z$ is the least number of the teeth of the sprocket of those sprockets which interact with the chain.

This makes it possible to use similar rollers for the chain.

In a more complicated embodiment of the invention it is expedient to provide three kinds of the rollers disposed in the chain side-by-side, the middle roller in this row having a middle portion contacting the sprocket tooth and being equal in length to the thickness of this tooth, and end portions contacting the rings, the length of each end portion being equal to a double thickness of the ring. One of the remaining two rollers has a middle portion of the same length as that of the end portions contacting the rings, each of which is equal to a triple thickness of the ring while the other roller has a middle portion whose length exceeds the middle portion of the adjacent rollers by a double thickness of the ring and the end portions contacting the rings, the length of these end portions being equal to a double thickness of the ring.

Such making of the chain permits the external diameter of each ring to be considerably increased and this increases the tensile strength of the chain.

It is expedient that the external diameter of each ring in said other version of the chain does not exceed a triple pitch of disposition of the rollers and the diameter of the portion end of the roller contacting the rings. In this case the rings roll when enveloping the chain sprocket with a number of teeth starting from 11 teeth.

The diameter of the portion contacting the sprocket teeth and of the portion holding the rings on this roller is preferably made in accordance with the following inequality:

$$e \geq d + 2t(1 - \cos(360°)/(z)),$$

where
  $e$ is a diameter of the roller portion contacting the sprocket teeth and of the portion of this roller which holds the rings thereon;
  $d$ is a diameter of the roller portion contacting the rings;
  $t$ is a pitch of disposition of the rollers;
  $z$ is the least number of the teeth of the sprocket from those sprockets with which the chain interacts. In this case there is eliminated orbitary removal of the rings from the rollers.

In order to provide for a possibility of assembly and disassembly of the chain, whose rollers consists of integral parts, the periphery of each ring is preferably provided with a flat positioned up to the center of the ring at a distance determined by the equality $$r = t(1.5 + 0.5 \cos(360°)/(z)) - (d)/(4),$$

where
  $r$ is a distance to be found,
  $t$, $d$ and $z$ are the above-said designations.

The present invention is advantageous in that the life of the chain transmission exceeds that of the known chain drives at least by a factor of 4, the efficiency of the proposed chain transmission being equal to 0.95 to 0.98.

Other objects and advantages of the invention will be better understood from the following description of some preferable embodiments thereof with reference to the accompanying drawings, in which.

Figure 1:
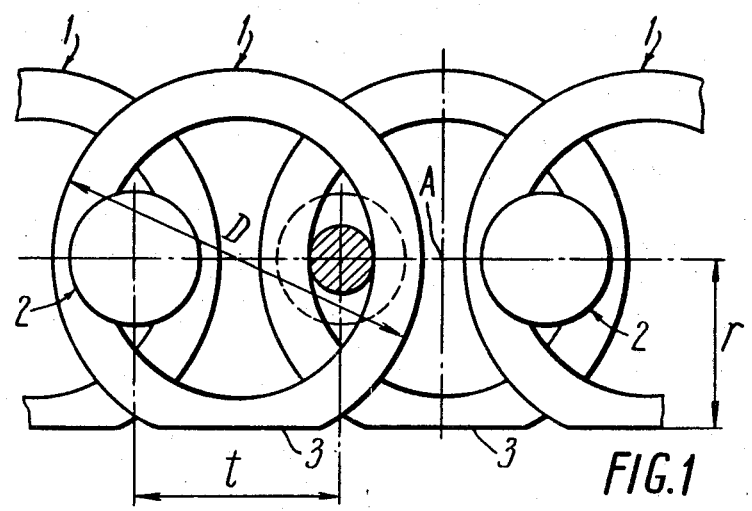
FIG. 1 is a side view of the first version of the chain, partly in section.
Figure 2:
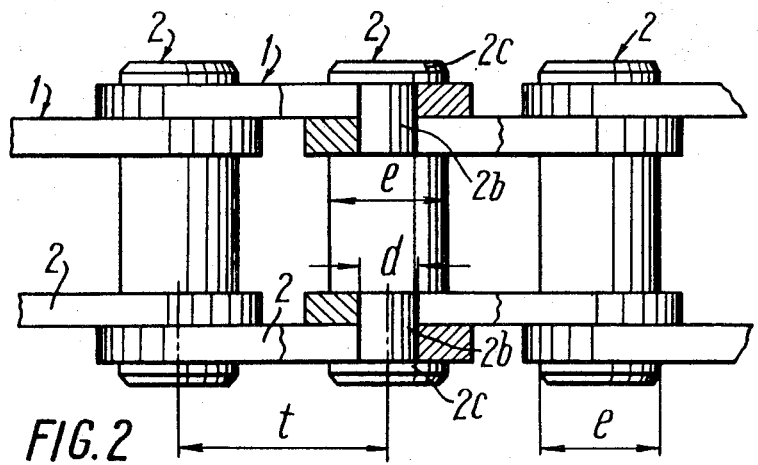
FIG. 2 is a top view of the same.

The chain for a chain transmission comprises links 1 (FIGS. 1 and 2) constituting rings interconnected through rollers 2.

Each roller 2 has five portions: a middle portion 2a contacting the sprocket teeth (the sprocket is not shown), two portions 2b, contacting pairs of rings 1, and end portions 2c holding the rings 1 on the rollers 2.

In this case the diameter $d$ of the middle portion 2b of the roller is by a factor of 4.5 less than the inner diameter of the ring. This ratio may be of another value but not less than 3.5. This is associated with the fact that when the chain envelopes the sprocket the rings run about the rollers and this is possible only in the absence of a lubricating medium. A rolling friction is developed which considerably reduces the wear of the chain and the sprocket teeth. However, at a ratio of the inner diameter of the ring to the diameter of the middle portion less than 3.5, the rings start to slip relative to the roller during the embrace of the sprocket by a chain having a number of teeth equal to or less than 13.

The inner diameter of each ring is equal to the sum of the pitch $t$ of disposition of the rollers 2 and the diameter $d$ of the middle portion 2b of the roller. Such making of the chain provides for uniform distribution of stresses in each link of the chain. The external diameter D of each ring 1 is determined by the inequality:

$$D \leq t(1 + \cos(360°)/(z)),$$

where
  $D$ is an external diameter of the ring,
  $t$ is a pitch of disposition of the rollers,
  $z$ is the least number of teeth of the sprocket from those sprockets which interact with the chain.

This makes it possible to use similar links and rollers and to considerably simplify the manufacture and operation of such a chain.

To eliminate arbitrary removal of the rings from the rollers, the diameters $e$ of the middle portion 2a and the end portions 2c are preferably made equal according to the following inequality $$e \geq d + 2t(1 - \cos(360°/2)),$$

where
  $e$ is a diameter to be found,
  $d$ is a diameter of the portion 2b
  $t$ is a pitch of disposition of the rollers
  $z$ is the least number of teeth of the sprocket from those sprockets which interact with the chain. To provide for a possibility of assembling and disassembling the chain having integral rollers, the periphery of each ring is provided with a flat 3 spaced from the center A of ring at a distance determined by the following equality $$r = t(1.5 + 0.5 \cos(360°)/(z)) - (d)/(4),$$

where
  $r$ is a distance to be found;
  $t$, $d$ and $z$ are the above-mentioned designations.

The presence of the flats 3 makes it possible to assemble and disassemble the chain by turning the rings 1 in such a way that the flat of one ring faces the flat of the other ring.

In this case the rings are moved to each other up to the contact of these flats. It is clear that the chain mounted on the sprockets will not be arbitrarily dismantled.

When the chain engages any sprocket, the teeth of this sprocket are in contact with the middle portions 2a of the rollers 2 which run over the external surface of the teeth. At the same time, the rings 1 contacting this roller run about the roller portion, which is in contact with these rings.

Due to the fact that the running is effected without any slipping, the wear of the chain and sprockets is very low. The chain transmission according to the invention does not require lubrication. Moreover, the presence of a lubricating medium may lead to undesirable slipping.

Figure 3:
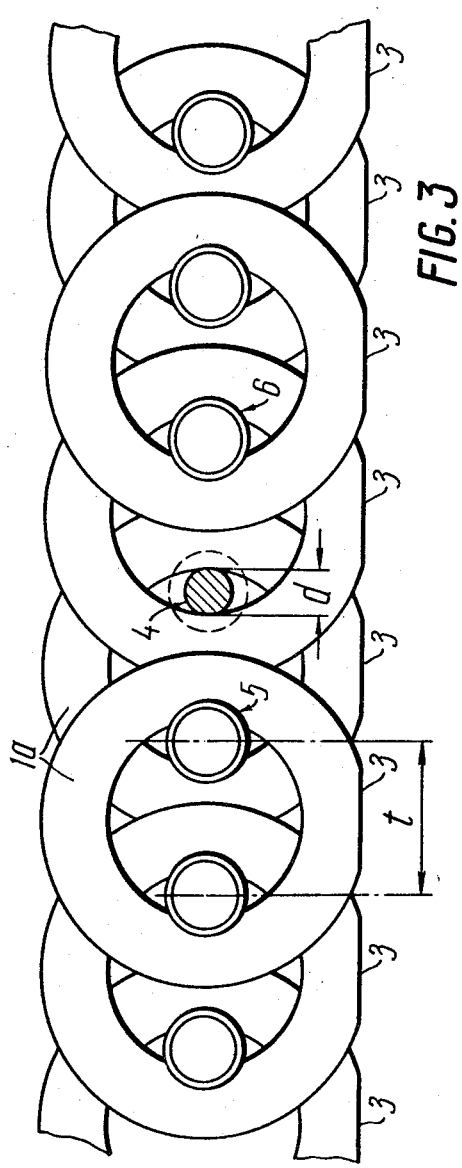
FIG. 3 is a side view of a part of the second version of the chain, partly in section.
Figure 4:
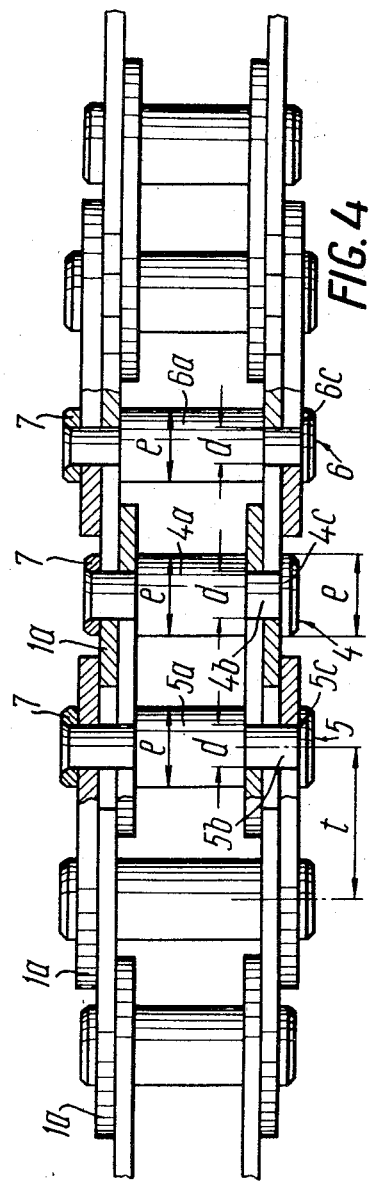
FIG. 4 is a top view of the same.

If it is necessary for the chain to have a high tensile strength, the rings 1a (FIGS. 3 and 4) are preferably made with a considerable difference of the inner and outer diameters at the same pitch $t$ of disposition of the rollers which is similar to the above-described version of the chain. In this case, however, it is necessary that the rings on the adjacent rollers are displaced relative to each other along the rollers.

This is possible if one of the rollers 4 has the same configuration as the roller 2 of the same size. The roller 5 located on one side of the roller 4 differs therefrom in that the length of its portion 5b contacting the rings 1a exceeds the length of the portion 2b of the roller 2 or the length of the portion 4b of the roller 4 by the thickness of the ring 1 or 1a.

The roller 6 disposed on the other side of the roller 4 differs from the latter in that the length of its middle portion 6a exceeds the length of the middle portion 4a by a double thickness of the ring 1a.

All rollers 4, 5 and 6 have washers 7 connected with the rollers through riveting.

The external diameter of each ring 1a does not exceed a triple pitch of disposition of the rollers 4, 5 and 6 and the diameter $d$ of the end portion of the roller contacting the rings. In this case the rings roll when enveloping the chain sprocket with a number of teeth starting from 11 teeth.

We claim:

1. A plate-link chain for a chain transmission comprising a plurality of plates interconnected by means of rollers, each plate comprising a substantially circular ring with the rings of different plates being substantially coplanar and disposed so as to overlap, said rollers being disposed to pass through overlapping rings.

2. A chain comprising ring links interconnected through rollers in which said rings are made with an internal diameter equal to a sum of the pitch of disposition of said rollers and the diameter of the portion of each of these rollers contacting said rings.

3. A chain comprising ring links interconnected through rollers in which the portion of each of said rollers contacting said rings has a diameter which at least by a factor of 3.5 is less than the internal diameter of each of said rings.

4. A chain comprising ring links interconnected through rollers in which each of said rollers has at least a pair of portions contacting said rings, the length of each portion being equal to a double thickness of each of said rings and the external diameter of these rings being determined by the following inequality $$D \leq t(1 + \cos(360°)/(z)),$$

where
$D$ is an external diameter of each of said rings,
$t$ is a pitch of disposition of aid rollers,
$z$ is the least number of teeth of the sprocket from those sprockets which interact with said chain.

5. A chain comprising ring links interconnected through rollers in which each third roller of said rollers has a pair of portions contacting said rings, the length of each portion being equal to a double thickness of said ring while the length of the middle portion of this roller contacting the sprocket tooth being equal to the thickness of this tooth, in which case at one side of this roller there is located another roller with a middle portion of the same thickness as that of said roller but having portions contacting said rings, each of these portions having a length equal to a triple thickness of said ring, and at the other side of the first of said rollers there is located a roller whose middle portion has a length exceeding the length of the adjacent rollers by a double thickness of said ring, while the length of each portion contacting said rings is equal to a double thickness of said ring.

6. A chain as claimed in claim 5 in which the external diameter of each said ring does not exceed the difference between the triple pitch of disposition of said rollers and the diameter of the roller portion contacting said rings.

7. A chain comprising ring links interconnected through rollers in which the diameters of the portions of said rollers contacting the sprocket teeth and the diameters of the portions of these rollers holding said rings on said rollers are made in accordance with the following inequality $$e \geq d + 2t(1 - \cos(360°)/(z)),$$

where
$e$ are diameters of the portion of the roller contacting the teeth of said sprocket and of said portion holding said rings on this roller,
$d$ is a diameter of the portion of said roller contacting said rings,
$t$ is a pitch of disposition of said rollers,
$z$ is the least number of the teeth of the sprocket from those sprockets which interact with said chain.

8. A chain comprising ring links interconnected through rollers in which provided on the periphery of each said ring is a flat spaced from the center of this ring at a distance determined by the following equation:

$$r = t(1.5 + 0.5 \cos(360°)/(z)) - (d)/(4),$$

where
$r$ is a distance to be found,
$t$ is a pitch of disposition of said rollers,
$z$ is the least number of teeth of the sprocket from those sprockets which interact with said chain,
$d$ is a diameter of the portion of said roller contacting said rings.

* * * * *